United States Patent [19]

Ijyuin et al.

[11] Patent Number: 5,160,476
[45] Date of Patent: Nov. 3, 1992

[54] METHOD FOR PRODUCING A RESIN PIPE FOR USE AS THE INNER LINING OF EXISTING PIPES

[75] Inventors: Makoto Ijyuin, Osakashi; Akihiko Tsuda, Neyagawashi; Shinichi Nawata, Nara, all of Japan

[73] Assignee: Tsutsunaka Plastic Kogyo Kabushiki Kaisha, Osaka, Japan

[21] Appl. No.: 757,681

[22] Filed: Sep. 11, 1991

[30] Foreign Application Priority Data

Sep. 18, 1990 [JP] Japan .................................. 2-249698

[51] Int. Cl.⁵ .............................................. B29C 47/90
[52] U.S. Cl. .................................... 264/563; 264/36; 264/209.4; 264/269; 425/326.1
[58] Field of Search ............... 264/209.5, 209.3, 209.4, 264/567, 269, 36, 566, 568, 563; 425/380, 326.1, 467, 325

[56] References Cited

U.S. PATENT DOCUMENTS

| | | | |
|---|---|---|---|
| 3,313,870 | 4/1967 | Yazawa | 264/567 |
| 3,541,189 | 11/1970 | Yoshikawa et al. | 425/71 |
| 3,752,630 | 8/1973 | Takagi et al. | 425/325 |
| 4,867,669 | 9/1989 | DaSilva et al. | 264/209.4 |

FOREIGN PATENT DOCUMENTS

| | | | |
|---|---|---|---|
| 0254489 | 1/1988 | European Pat. Off. | 264/269 |
| 58-166026 | 10/1983 | Japan | 264/567 |
| 59-169822 | 9/1984 | Japan | 264/209.3 |
| 60-120027 | 6/1985 | Japan | 264/209.3 |
| 62-41014 | 2/1987 | Japan | 264/209.4 |

Primary Examiner—Jeffery Thurlow

[57] ABSTRACT

A polyvinyl chloride resin pipe is produced for use as an inner lining for repairing or reinforcing sewerage pipes or other existing pipes. An airtight packing is disposed in the resin pipe and between a traction device and a reheating device, with the traction device pulling forwards the resin pipe which has been extruded from an extruder. An internal pressure is imparted to the resin pipe by introducing compressed air from a forward end thereof so that the resin pipe is depressed flat while being reeled up on a drum in such a state that an internal space is maintained without failure within the resin pipe. In use, a heating medium is fed into the resin pipe from its end so that it rapidly becomes soft uniform as a whole, whereby a defect-free inner lining is formed in the existing pipes.

9 Claims, 3 Drawing Sheets

METHOD FOR PRODUCING A RESIN PIPE FOR USE AS THE INNER LINING OF EXISTING PIPES

BACKGROUND OF THE INVENTION

1. Field of the Invention

The invention relates to a method for producing a resin pipe for use as the inner lining of existing pipes, and more particularly, to a method for producing a resin pipe which is to be inserted into such existing pipes that have been installed underground or in the building body so as to serve as sewerage pipes or cable ducts, wherein these existing pipes or ducts are repaired or reinforced with the inner lining referred to above.

2. Description of Prior Art

To repair the existing pipes in such a manner as referred to above, there was recently proposed and is widely noticed in the art a kind of lining method ( for example, a method as disclosed on the Japanese Patent Publication Kokai No. 1-295828), in which a hard or semi-hard resin pipe is heated to soften so that it can be inserted in said existing pipes and expanded therein in the radial direction by introducing an amount of hot compressed steam.

In the conventional method, resin pipes made of hard polyvinyl chloride are widely used as the material of the linings. A unit or span length of the existing pipes to be lined varies from about 10 to 100 meters. Accordingly, the resin pipes also have to be of a length corresponding to the unit length.

Such a long resin pipe for the lining process is depressed flat before they are wound up around a take-up drum or bobbin. The wound resin pipe is transported to a site where the lining work is done, and a heating medium such as hot compressed steam is introduced into the resin pipe through one of its opposite longitudinal ends. The thus softened resin pipe is reeled out from the drum or bobbin so that the leading end of the resin pipe is pulled into and through the existing pipe's portion which must be repaired.

In detail, the prior art resin pipes as the lining material have been produced in a manner such that a raw resin is extruded to form a cylindrical pipe having a predetermined diameter, with the cylindrical pipe being heated again to become softer and successively being reeled up on the take-up drum forcibly under a given tension which causes the pipe to become flattened. Alternatively, the extruded pipe is forced through between a pair of depressing rollers disposed in parallel with each other, whereby the intentionally depressed pipe assumes an elliptical shape in its cross section.

The lining resin pipe which is flattened and reeled up in this manner tends to take an almost collapsed configuration having as a whole a greatly reduced thickness in cross section as is shown in FIG. 6. Because this tendency is influenced by any of factors such as a larger diameter of unreeled pipe and a thinner pipe wall, these factors imparted in combination will make worst the state of said reeled-up resin pipe. Such a flat depressed resin pipe reeled on the drum "D" in FIG. 6 is advantageous in that due to a decreased overall volume on said drum an additional r length of the depressed resin pipe 21 can be accommodated on a single drum. However, the collapsed state of the resin pipe is remarkably disadvantageous as will be described below, when the resin pipe is used to carry out the lining process.

Convolutions of the depressed resin pipe 21 shown in FIG. 6 have each in its cross section a pair of bent ends having a relatively small radius of curvature. Merely a small space 22 is formed inside each of the sharply bent ends, and a couple of facing walls 21a and 21a are in close contact with each other between the opposed bent ends, over the entire or most length of the resin pipe. Therefore, the heating medium such as steam cannot be distributed uniformly over the full length of the reeled-up depressed resin pipe 21, when it is heated and softened by forcing the heating medium into the resin pipe through a hose 12 previously connected to the pipe's inner end which was a leading end when the pipe was reeled up. Consequently, it will take not only a longer time to fulfill the heating medium throughout the resin pipe 21, but also the portions thereof in any cross section as well as the portions along the pipe will not be heated and softened uniformly. In other words, the opposite bent ends having the small spaces 22 in cross section will be preferentially heated and softened, while some longitudinal portions will not be sufficiently heated and softened since the heating medium does not flow uniformly through the resin pipe.

As shown in FIG. 5, the outer or leading end of such an ununiformedly heated and softened resin pipe will be secured to a pulling rope 14 so as to be pulled through the existing pipe "P". The portions which have not softened enough will however cause the reeled-up resin pipe to maintain its curved shape, thus necessitating an additional power to overcome an increased resistance to the pulling force, and still making it difficult to insert the resin pipe smoothly into the existing pipe.

The stronger pulling force will bring about the partial or local elongation of the depressed resin pipe 21 at its well softened portions. Due to the forced sliding contact of the existing pipe "P" with the inner surface, the resin pipe will be scratched on its outer surface to produce damages which might break down the resin pipe in the worst case.

In addition to the problems encountered when the resin pipe is inserted, there arise further problems when the internal pressure is charged to expand the depressed resin pipe 21 after it is inserted. Particularly, the inner surface of opposite bent ends and/or the portions having a reduced wall thickness of are likely to produce cracks which might result in burst of the resin pipe in the worst case, because it is softened in an unequal manner, the hair-pin-like bent ends in cross section are apt to excessively deform when the resin pipe expands, its wall thickness has been reduced unevenly due to the elongation when inserted into the existing pipe, and the resin pipe has been scratched on its outer surface.

OBJECTS AND SUMMARY OF THE INVENTION

An object of the present invention which was made to resolve the various problems mentioned above is therefore to provide a method for producing a resin pipe for use as the inner lining of existing pipes, wherein the resin pipe is depressed into a predetermined cross-sectional shape such that a heating medium, for example compressed steam used in the lining operations, can smoothly heat the depressed resin pipe to soften uniformly.

The present method is characterized principally in that a resin pipe, which is extruded at first to be of a circular cross-sectional shape, is successively reeled up on a drum while being heated and softened under a predetermined internal pressure imparted to the resin pipe.

According to the method, a resinous material is continuously extruded through a circular die of an extruder so that a resin pipe is formed, the resin pipe being pulled thereafter by a traction device so as to successively cool down and solidify before advancing into a reheating device which is disposed beyond the traction device, and then the resin pipe, which will have been heated from its outer periphery and become soft and flexible within the reheating device, being finally reeled onto a take-up drum while remaining soft and flexible, wherein an airtight packing is positioned within the resin pipe between the traction device and the reheating device so that compressed air or gas is introduced into the resin pipe through its open forward end, whereby an internal pressure is imparted to the reheated resin pipe which is being reeled onto the take-up drum.

A soft and elastic columnar member, which is not gas—permeable and is of a diameter equal to about 100 to 150% of the inner diameter of the resin pipe, may be employed well as the airtight packing. To realize a higher air-tightness, it will be more desirable to use the columnar member having a diameter corresponding to 105% or more of the inner diameter of the resin pipe.

DETAILED DESCRIPTION OF PREFERRED EMBODIMENTS

The accompanying drawings will now be referred to for a detailed description of the preferred embodiments of the invention.

Figure 1:
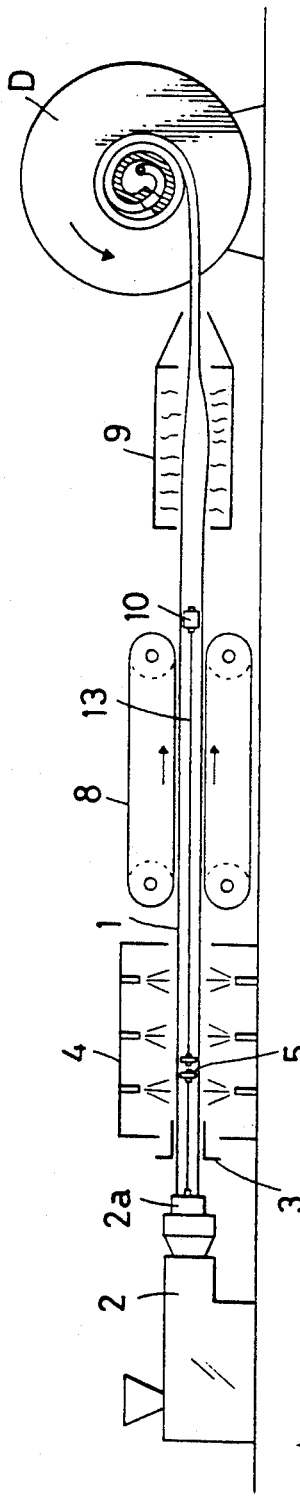
FIG. 1 is a scheme showing an apparatus which may be used to perform a method provided in the invention to produce a resin pipe for use as the lining of existing pipes.

In FIG. 1, a resin pipe 1 for use as the lining of existing pipes is produced by extruding a thermoplastic resin such as a hard polyvinyl chloride resin through a circular die 2a of an extruder 2. The resin pipe 1 thus extruded into a circular shape will continuously advance through a sizing die 3 and a cooler 4 so as to be pulled forwards by a traction device 8 in accordance with the conventional method.

Figure 2:
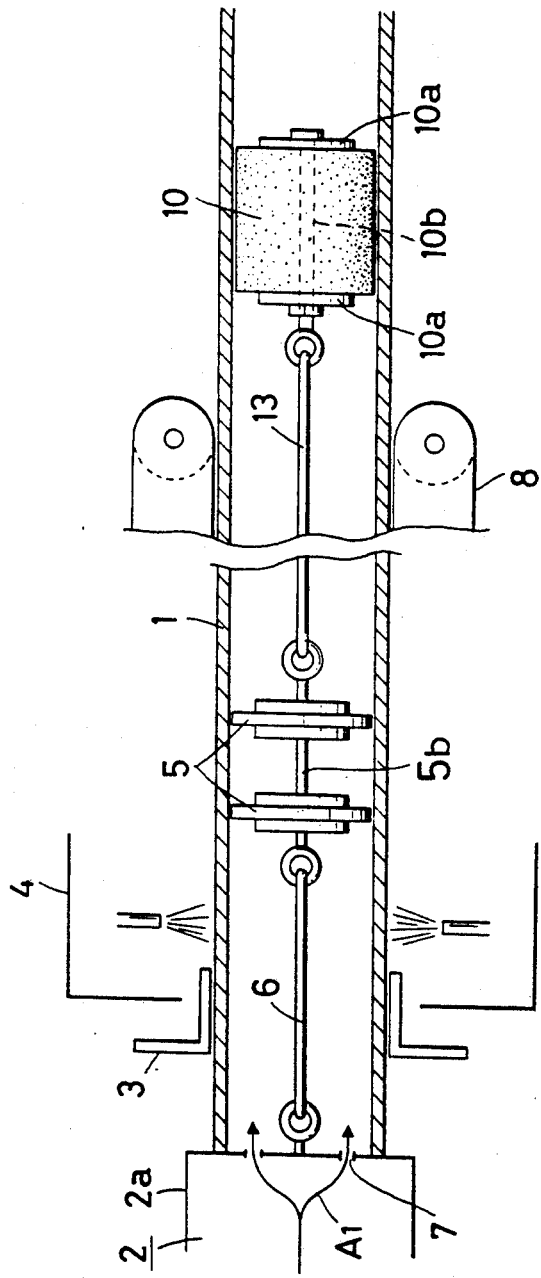
FIG. 2 is a cross section of the principal portions of the apparatus shown in FIG. 1.

The sizing of the resin pipe 1 may be effected also according to the conventional method. As shown in FIG. 2, floating plugs 5 within the resin pipe 1 are disposed beyond the sizing die 3. A low-pressure compressed air "A1" is blown through forward apertures 7 of the circular die 2a into the resin pipe 1 which is at its half-molten state. A slight inner pressure is given to the resin pipe 1 so that its outer periphery is kept in contact with the sizing die 3 while the resin pipe cools down. The floating plugs 5 stand immovable, since they are connected in general to a die mandrel by a connecting member 6 such as a wire or chain.

The traction device 8 pushes forwards the resin pipe 1 so that it travels through a reheating device 9 which employs steam as a heating medium. The resin pipe will be heated from its outer periphery to a predetermined softening temperature, and subsequently reeled onto a take-up drum "D" while the resin pipe is still soft and flexible.

The abovedescribed basic process for producing the lining resin pipe 1 is conventional and well established in the art. The method in accordance with the invention is applied to the conventional process in such a manner that compressed air "A2" is continuously supplied into the resin pipe 1 from its forward open end while the resin pipe is being wound on the take-up drum "D". An airtight packing 10 is also disposed, according to the invention, within the resin pipe between traction device 8 and the reheating device 9. Thus, a predetermined internal pressure will be always given to the resin pipe 1 while the reeling up thereof is carried out by the drum "D".

The airtight packing 10 is a soft and elastic columnar member made of a polyurethane foam, synthetic rubber or the like, and preferably is of an outer diameter equal to about 100 to 150% of the inner diameter of the resin pipe 1. In an example shown on the drawings, the airtight packing is sandwiched between a forward and rearward plates 10a and 10a. These plates are secured one to another by a central rod 10b penetrating the packing. A rearward end of the central rod 10b is tied to a forward end of a further central rod 5b of the floating plugs 5, by means of a linear connecting member 13 such as a wire, chain or the like. The airtight packing 10 will be kept in position in this manner.

In operation, the airtight packing 10 must be pushed tightly into the open forward end of the resin pipe 1, immediately after this end will have just protruded from the traction device 8.

The steam in the reheating device 9 is thus prevented from going upstream beyond the airtight packing, though an amount of the steam is likely to enter the resin pipe from its open forward end when it travels through the reheating device. Such a function of the airtight packing enables the traction device 8 to continuously draw the resin pipe 1 in a smooth and sure manner. It is noted in this connection that, if the steam in the reheating device 9 flows backward through the resin pipe to the traction device 8 or beyond it to come near the cooler 4, the cooling and solidifying of said pipe would become insufficient or the resin pipe would become so extremely soft that the traction device 8 causes it to deform and thereby fails to push it forward in a stable manner. The resin pipe 1 which is clogged, in the method of the invention, with the airtight packing 10 disposed near the exit of the traction device 8 will be free from those problems.

Figure 3:
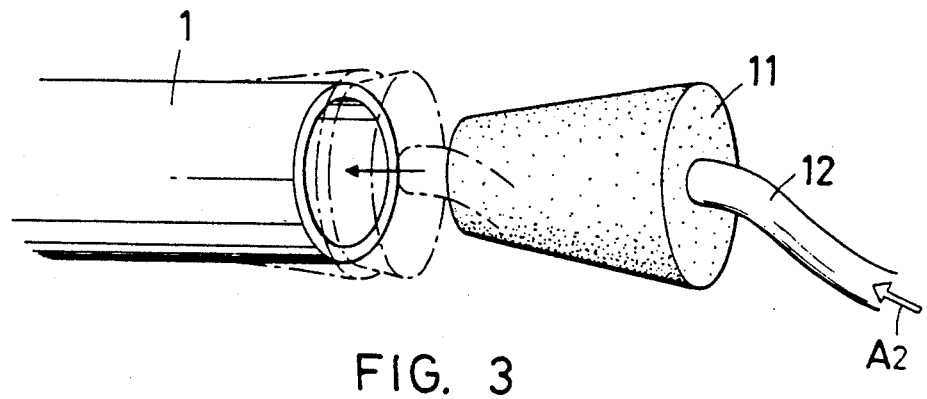
FIG. 3 is a perspective view illustrating an end plug which has an air hose connected thereto and is being inserted into a forward open end of the resin pipe.
Figure 4:
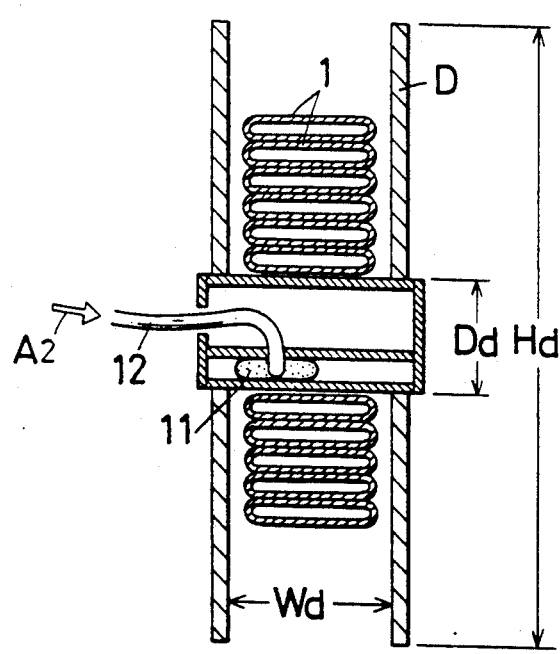
FIG. 4 is a schematic cross-sectional view showing a state of the resin pipe which is reeled on a take-up drum in the method of the invention.
Figure 5:
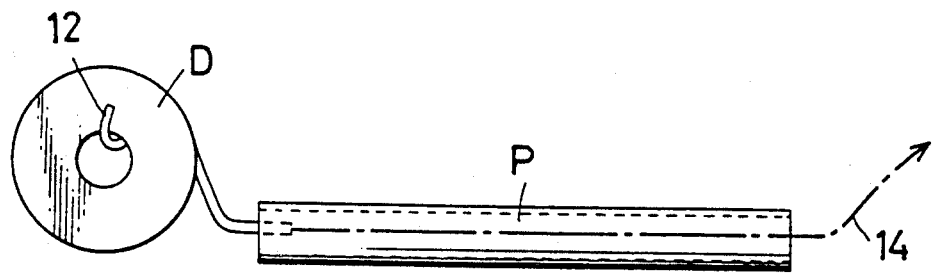
FIG. 5 shows in outline the step of inserting the resin pipe into the existing pipe whose inner surface is to be lined with said resin pipe.

At the subsequent step of the method, an end plug 11 clogging the open forward end of the resin pipe 1 will be tightly engaged therewith when it has just protruded from the reheating device 9, wherein the end plug 11 is made of a rubber or the like and has an air hose 12 attached thereto as shown in FIG. 3. Immediately after this step, the forward end of the resin pipe 1 is secured to a cylindrical portion of the take-up drum "D". A high-pressure compressed air "A2" will then be charged into the resin pipe 1 through the air hose 12. The pressure of this compressed air depends on the diameter and wall thickness of the resin pipe, and in general, desirably falls within a range from about 0.1 to 0.6 Kgf/cm$^2$. An excessively high pressure will cause an undesirable inflation or expansion of the resin pipe 1 advancing through the reheating device 9, while an extremely low pressure will make it impossible to realize the desirable effects provided by the invention. Due to this compressed air "A2" introduced in the described manner, the predetermined internal pressure will be imparted to the resin pipe portion between the forward end and the airtight packing 10. With this region maintained at the internal pressure, the resin pipe will be wound around the drum's cylindrical core to thereby form many convolutions successively one turn on another while the take-up drum "D" is driven to rotate at variable speeds corresponding to the feed speed of the resin pipe. It will be understood here that the resin pipe 1 is depressed to a certain extent caused by the pressing load which results from the force for winding the resin pipe onto the drum's cylindrical core. The depression degree of the resin pipe is such that the internal pressure therein affords the resin pipe an internal space of a desirable size, whereby the cross section of resin pipe obtains a flat elliptical shape. This depressed shape is almost uniform along the entire length of resin pipe 1 reeled up on the drum, since the resin pipe rapidly cools down below its softening temperature while being reeled, due to its contact with the drum's cylindrical core, with the inner convolution and also due to spontaneous cooling of the resin pipe.

As described above, the low-pressure compressed air "A1" is introduced into the resin pipe's portion located just ahead the circular die 2a so as to impart the lower internal pressure to said portion. If the relatively higher pressure of the other compressed air "A2" from the open forward end of the resin pipe 1 were allowed to give influence on said portion near the die, then the resin pipe would undesirably deform or expand to disturb the sizing step. The airtight packing 10 in the invention is effective also to preclude such a problem by preventing the compressed air "A2" from flowing back towards the die 2a.

In a practical example of the invention, the resin pipe for use as the lining may be made of the most popular polyvinyl chloride resin which will soften at a temperature from about 73° to 76° C. The heating temperature at the reheating device 9 may be set to fall within a range of about 80° to 85° C. The resin pipe heated to this temperature will subsequently be caused to cool down, due to spontaneous cooling in the course of time or due to forcible air cooling, to a temperature of about 75° to 78° C. This lowered temperature is still higher than the softening temperature, and also higher than but very near the lowest temperature which permits the resin pipe to be wound on the take-up drum "D" Accordingly, the resin pipe will advantageously be taken up on said drum at the temperature mentioned last.

1 Example

An example of the embodiment will now be given below in detail and in comparison with a blank which will also be given below.

In the example, a hard polyvinyl chloride resin having a softening temperature of about 75° C. was employed as the raw material of the resin pipe. This resin was extruded by the extruder 2 having the circular die to form the resin pipe circular in cross section and having an outer diameter of 470 mm and a wall thickness of 8.0 mm. The extruded pipe then advanced through the sizing die 3 and through the cooler 4 so as to cool down and solidify. An airtight packing 10 was inserted into the forward end of this solid resin pipe 1 immediately after said end had traveled ahead the traction device 8. The airtight packing 10 which was a polyurethane foam block of 550 mm in diameter was inserted into the resin pipe after diametrically compressed for insertion. The resin pipe was then guided into the reheating device 9 so that the steam for reheating said pipe was blown to the outer periphery thereof so as to raise its temperature to about 80° C. As a result, the resin pipe 1 was softened to such a degree that it did not tend to bend down. An end plug 11, which was made of a synthetic rubber of a flat elliptical shape in cross section and having the air hose 2 penetrating said plug, was subsequently inserted tightly into the leading end of resin pipe which had just come out of the reheating device 9. Then, the resin pipe's leading end which had been clogged with the end plug was secured to the take-up drum "D" at its cylindrical core located adjacent to the exit of the reheating device Immediately thereafter, it was started to blow a compressed air of 0.5 Kg/cm$^2$ into the resin pipe 1 through the air hose 12 penetrating the end plug. This step of feeding the compressed air was continued while the rotating take-up drum "D" was continuously reeling up the softened resin pipe 1 still at 76° to 78° C. so that a length of about 100 meters was wound to form on that drum "D" many mutually overlying convolutions of the resin pipe 1. The outer diameter "$H_d$" of the take-up drum's flanges was 2,800 mm, the distance "$W_d$" between them was 800 mm, and the outer diameter of the drum's cylindrical core "$D_d$" was 700 mm.

The resin pipe 1 thus wound was uniform in cross sections from its leading end to its trailing end, which cross sections were of a flat elliptical shape.

2 Blank

Similarly to the example, a polyvinyl chloride resin pipe was formed by extrusion. However, any airtight packing 10 was not employed but a cloth was temporarily inserted into an open forward end of the resin pipe which had cooled down and solidified, before it entered the reheating device 9. The resin pipe was heated therein by steam to about 80° C, and a similar end plug 11 made of rubber and having an air hose 12 was substituted for the cloth, before it was started to continuously wind the resin pipe on the same drum "D" in such a manner that no amount of high-pressure compressed air was introduced in the resin pipe.

Figure 6:
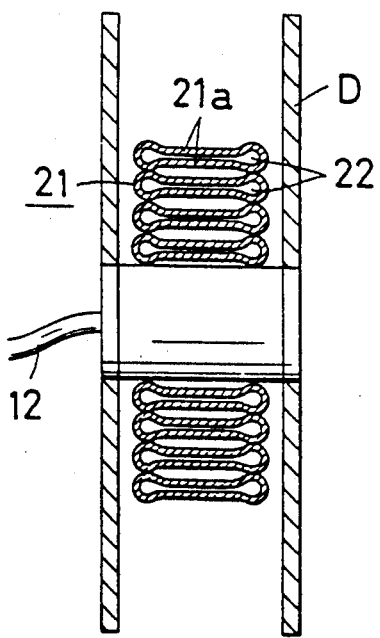
FIG. 6 is a schematic cross-sectional view showing a state of a prior art resin pipe reeled on a take-up drum.

The cross section of the resin pipe 21 wound in this manner was of such an uneven shape as shown in FIG. 6, wherein its pipe walls were collapsed irregularly and its wall portions facing one another were in close contact with each other in almost all the sections along the resin pipe.

3 Comparative test

The resin pipes 1 and 21 which had been wound to form many overlying convolutions were subjected to a test in which a steam of 0.6 Kg·f/cm$^2$·G at 112° C. was forced into said pipes for 10 minutes through the air hose 12 connected to their inner ends. The time for the compressed air to penetrate 100 meters, i.e., entire lengths of the resin pipes was determined by measuring the time when the feeding of compressed air started as well as the time when it began to be discharged from the resin pipes' outer ends. The surface temperature of the resin pipes 1 and 21 near the outer ends was also measured. Results of these tests are given on Table 1.

Next, performance test was carried out to detect how the resin pipes 1 and 21 behave when inserted into the existing pipes. A steel pipe 10 m long and having an inner diameter of 550 mm was laid horizontal and regarded as an existing pipe "P" A pulling rope 14 was used to pull through the existing pipe the resin pipes 1 and 21 while they, which had been heated to soften as described above, were reeled out from the drum "D".

In such a performance test, the forces and times necessary for the pulling rope 14 to insert the resin pipes 1 and 21 were measured and compared with each other. Results of this test are also given on Table 1.

TABLE 1

|  | Example | Blank |
|---|---|---|
| Time for steam to pass through resin pipes (minutes) | 4 | 8 |
| Surface temperature of resin pipe ends after steam feed for 10 minutes (°C.) | 73 | 50 |
| Pulling force to insert resin pipes (Kg) | 220 | 350 |
| Time needed to insert resin pipes (minutes) | 3 | 15 |

As will be seen from Table 1, the heating steam can flow more smoothly and readily through the resin pipe wound in the example of the embodiment of the invention than through the resin pipe wound in the blank, i.e., according to the conventional method. In other words, the resin pipe provided by the method of the invention is rapidly heated to soften uniform. It was ascertained accordingly that, even through a relatively low force is used to pull the resin pipe prepared in accordance with the method of the invention, it can be inserted within a shorter time smoothly into the existing pipes.

In summary, the lining resin pipe which is extruded and cooled to solidify will be reheated to become softened according to the method of the invention in such a manner that the softened resin pipe is wound on the take-up drum, with the compressed air being introduced into said pipe so as to impart the predetermined internal pressure thereto, whereby each convolution of the wound resin pipe assumes a depressed shape in cross section which has a desirable internal space without failure. It is also to be noted again that the airtight packing is disposed within the resin pipe intermediate the traction device and the reheating device so that said pipe will be reheated under a desirable internal pressure, and at the same time said pipe will be protected from any undesirable thermal influence, which would be incurred at the reheating zone if such an airtight packing were not employed. This feature is advantageous in that the pipe pulling speed of the traction device is maintained so stable that any undesirable unevenness will not be produced as to the wall thickness of the resin pipe, which unevenness would otherwise be produced if said speed were significantly varied during the traction process.

Consequently, these features in combination enable the resin pipe reeled up in such a manner to be rapidly softened uniform over its entire length when in the lining work the heating medium is introduced from one end of said resin pipe, whereby the resin pipe can be inserted into any existing pipe so smoothly that any damage or breakage of said resin pipe is avoided to form a defect-free lining layer inside the existing pipe. Thus, the lining works in which the resin pipes provided by the present method are used can be performed in a shorter time, with a reduced labor and reduced power consumption and with a decreased amount of heating medium, thereby lowering the cost of the lining works.

What is claimed is:

1. A method for producing a resin pipe for use as the inner lining of existing pipes, the method comprising the steps of: continuously extruding a resinous material through a circular die of an extruder so that a resin pipe is formed; pulling thereafter the resin pipe by a traction device causing the resin pipe to successively cool down and solidify before advancing into a reheating device which is disposed beyond the traction device; reheating the resin pipe from its outer periphery so as to make soft and flexible the resin pipe in the reheating device; and finally reeling up the resin pipe onto a take-up drum while the resin pipe is still flexible, wherein an airtight packing is disposed in the resin pipe between the traction device and the reheating device so that compressed air or gas is introduced into the resin pipe from its open forward end, whereby an internal pressure is imparted to the reheated resin pipe which is being reeled onto the take-up drum.

2. The method as defined in claim 1, wherein the internal pressure within the reheated resin pipe is selected from a range of 0.1 to 0.6 Kgf/cm$^2$.

3. The method as defined in claim 1, wherein the airtight packing is kept in position by means of a connecting member which is connected to floating plugs disposed in the resin pipe for the purpose of sizing it.

4. The method as defined in claim 1, wherein the airtight packing is a soft elastic columnar member which is not gas-permeable and has an outer diameter equal to about 100 to 150% of the inner diameter of the resin pipe.

5. The method as defined in claim 4, wherein the outer diameter of the airtight packing is from 105 to 150% of the inner diameter of the resin pipe.

6. The method as defined in claim 4, wherein the airtight packing is made of a polyurethane foam.

7. The method as defined in claim 1, 2, 3, 4, 5 or 6, wherein the temperature of the resin pipe which is being reeled up on the drum is set at the lowest softening temperature enabling the resin pipe to be reeled.

8. The method as defined in claim 1, 2, 3, 4, 5, or 6, wherein the resinous material is a hard polyvinyl chloride resin.

9. The method as defined in claim 8, wherein the polyvinyl chloride resin pipe is reeled at its temperature between 75° and 78° C. its softening temperature being from 73° to 76° C.

* * * * *